Oct. 24, 1944. R. J. KEHL Re 22,557
GAS GENERATING SYSTEM
Original Filed Feb. 24, 1940
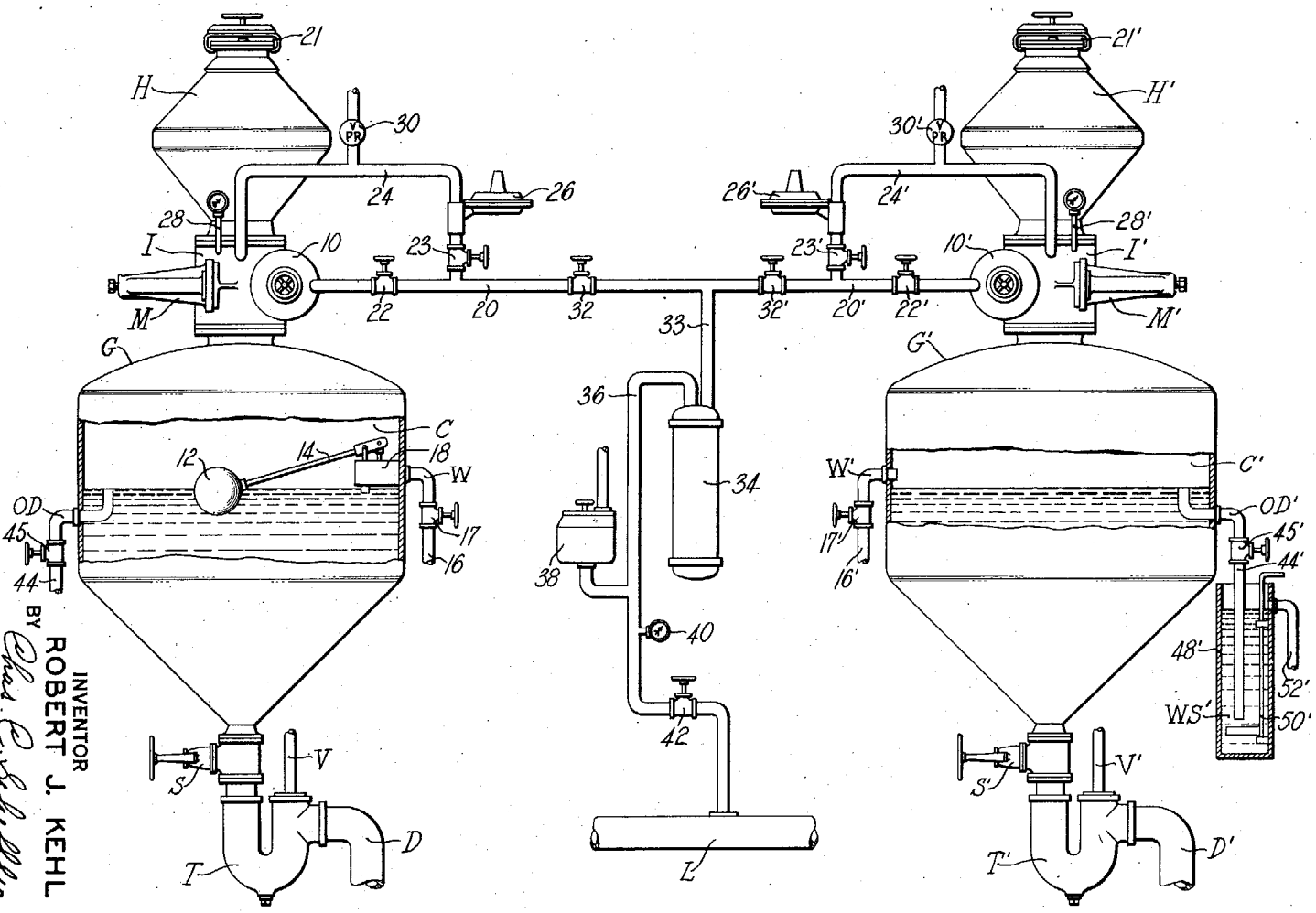
INVENTOR
ROBERT J. KEHL
BY Chas. C. Scheffler
ATTORNEY Reissued Oct. 24, 1944

Re. 22,557

UNITED STATES PATENT OFFICE 22,557

GAS GENERATING SYSTEM

Robert J. Kehl, Manhasset, N. Y., assignor, by mesne assignments, to Union Carbide and Carbon Corporation, a corporation of New York Original No. 2,309,701, dated February 2, 1943, Serial No. 320,555, February 24, 1940. Application for reissue November 15, 1943, Serial No. 510,437

15 Claims. (Cl. 48—38)

This invention relates to a method of and apparatus for continuously supplying gas, derived from the reaction of a solid with a liquid, such as calcium carbide and water, to a service line or other consuming means, and more particularly for continuously supplying acetylene at medium pressures of about one atmosphere gauge from a plurality of interconnected generators, including at least one carbide-to-water generator.

The generation of gas from a solid by means of a liquid, such as the generation of acetylene from calcium carbide and water, is often carried out in low pressure apparatus that is recharged from time to time with liquid and solid. Acetylene requirements for industrial purposes are usually subject to sudden and severe demands which are ordinarily met first, by the expansion of acetylene, and secondly, by an increase in the rate of acetylene generation. Inasmuch as the pressure of acetylene at the point of use is usually slightly greater than atmospheric pressure, and since the pressure of acetylene in low pressure generators does not exceed about one pound per square inch gauge, little, if any, advantage can be taken in systems including such low pressure generators of acetylene expansion to meet sudden and severe acetylene requirements unless a large gasometer is employed. If the gas is to be piped a considerable distance or if gas is needed at higher pressures, it is customary to pump acetylene from the low pressure gasometer to the distribution system or consuming means.

Methods and apparatus are known for continuously supplying acetylene at a pressure only slightly above atmospheric pressure and such apparatus usually includes one or more acetylene generators, associated water seals and a gasometer. Such apparatus is described in my prior United States Patent No. 1,841,446 and comprises a low pressure duplex generating apparatus in which at least one generator continuously supplies gas to a conventional holder, the rise and fall of the latter being used to operate the carbide feed mechanism in the generator. During recharging of one of the generators and while the sludge is being drained from the generating chamber thereof, acetylene is supplied to said chamber from the gas holder, after passing through a water seal, in an amount sufficient to replace the volume of sludge being drained. Due to the low operating pressure employed a relatively large volume of gas substantially equal to the volume of discharged sludge must be supplied to the generator being recharged and this may impart a rather heavy load on the operating generator. To eliminate the disadvantages attendant with the use of gasometers and the usually associated pumping equipment it has been proposed to generate acetylene at medium pressure, e. g. at a pressure of about one atmosphere gauge. However, the methods of recharging such medium pressure generators heretofore employed involve, as one of the steps in the recharging operation, venting the generator to purge the latter of any acetylene-air mixture that may have been formed in the recharging operation. Due to the relatively large size of such commercial equipment and the higher operating pressures, such venting results in appreciable loss of acetylene and also prolongs the time the generator is out of operation.

Accordingly, the primary object of this invention is to provide an improved method for producing and continuously distributing acetylene for commercial purposes at medium pressures, of at least about one atmosphere gauge, and to provide an apparatus for carrying out the method, such method and apparatus being adapted to overcome the above and other difficulties encountered particularly in the medium pressure generation and supply of acetylene.

Other objects of the invention include the provision of a plurality of acetylene generators capable of supplying large volumes of acetylene at a uniform medium or higher pressure and substantially uninterruptedly to meet commercial requirements, said generators including at least one carbide-to-water generator; to provide a method of recharging such carbide-to-water generator without loss of acetylene and to prevent the formation of an air-acetylene mixture in the generator or supply lines; to eliminate the necessity for using water seals during the normal operation of the generator or generators; to eliminate, in recharging such medium or higher pressure carbide-to-water generator, the necessity for blowing off acetylene-air mixture before resuming generator operation; and to provide a medium or higher pressure generating system for continuously supplying acetylene without the necessity of maintaining a gasometer in the supply line.

The above and other objects and novel features of the invention will become apparent from the following description and drawing, in which:

The single figure is an elevational view, partly in section, of an acetylene generating system embodying the features of this invention.

Generally speaking, the invention comprises the provision of a gas generating and supplying system comprising a plurality of medium or higher pressure acetylene generators, including at least one carbide-to-water generator, connected in parallel and operated so that at least one of the generators continuously supplies acetylene to a service line while another of said generators is being recharged. It is not necessary to employ a gas holder in the supply line, since each of the generators has a substantial pressure reserve capacity of acetylene available to meet sudden and severe acetylene demands. Recharging the medium or higher pressure carbide-to-water generator to prepare it for operation is accomplished without loss of acetylene and with a minimum of recharging time, by interrupting the direct connection of the spent or exhausted generator from the supply system and discharging calcium hydrate sludge, which usually collects at the bottom of the generating chamber, from such generator, and, supplying acetylene to said generator directly from one or more of the other operating medium or higher pressure generators of the system as needed during the recharging operation in an amount sufficient to maintain continuously in said generator throughout such recharging operation a pressure at least slightly above atmospheric pressure.

The residual gas in the generator, initially under a pressure of at least about 10 to 15 pounds per square inch gauge, expands against the sludge and causes the latter to be rapidly discharged from the generator. Due to the rather large residual gas storage capacity of the generator only a relatively small amount of gas need be added to the generator to maintain continuously therein, during the sludge discharging and carbide hopper recharging steps, a preselected superatmospheric gauge pressure of at least a few inches of water. After removal of the sludge the carbide hopper is recharged and then the generating chamber is refilled with water to the proper level. The generator water supply conduit may be directly connected to the plant or city water supply system and thus water at a pressure of about 30 to 80 pounds per square inch gauge is available to fill the generating chamber to the proper level and to compress the acetylene therein substantially to service line pressure. It has been observed that due to the solution of the acetylene in the water the pressure in the generating chamber, after it has been properly filled with water, usually will not exceed the operating pressure of the generator. After charging the hopper of the generator with calcium carbide, generation is resumed by permitting such carbide to contact said water.

This method of recharging an acetylene generator precludes the possibility of air leaking into the generator and consequently obviates the usual necessity for purging the generator before it is permitted to supply acetylene to the system; thus resulting in a considerable saving of both acetylene and of the time the generator is out of service.

The recharged generator now floats on the acetylene supply line until another generator in the system has run out of carbide, as evidenced by a slight fall in acetylene pressure. The recharged generator then automatically supplies sufficient acetylene to maintain the desired pressure in the service line, and the spent or exhausted generator, if a carbide-to-water generator, is then recharged in the manner described above.

While the drawing illustrates a pair of medium pressure carbide-to-water type generators, it is to be understood that it is exemplary of only one embodiment of the invention, and the invention is applicable equally to a system having other types of medium pressure generators, such as the water recession type or the dry generation type, or a combination of such types, providing that at least one generator in the system is a carbide-to-water generator.

As illustrated in the drawing, the gas supply system comprises a pair of similar medium pressure generators G and G′ of the carbide-to-water type and in the interest of clarity and succinctness one generator only will be described, it being understood that the same reference character primed designates the similar part on the other generator.

Generator G comprises a generating chamber C, provided with a water supply unit W connected to a suitable pressure water source 16, a conventional water overflow drain $O_D$, and a sludge drain-off valve S. The valve S is connected with a sludge trap T which prevents escape of acetylene after the sludge has been discharged from chamber C. The trap T is provided with a suitable vent V to prevent syphoning of the entire volume of sludge down the drain D. An intermediate feed valve housing I disposed between the generating chamber C and a suitable calcium carbide hopper H is provided with auxiliary or gas control accessory equipment with which such generators are usually provided. This accessory equipment usually includes conventional pressure means M for controlling the flow or feed of carbide from the hopper H to the generating chamber C and an acetylene pressure regulator 10, which may be located in any suitable position on the housing I. The hopper H is also provided with a conventional hopper charging door 21. Preferably the pressure regulators 10 and 10′ on each generator are set to deliver gas to the system at the same pressure.

The water supply unit W may be automatic, if desired, on either or both generators and includes a float 12 connected by a rod 14 to a conventional automatic float valve mechanism 18 to which conduit 16, adapted to supply water at a suitable pressure, is secured. A shut-off valve 17 is suitably disposed in the conduit 16. If the valve 17 is open, water is permitted to enter the generating chamber C in accordance with the position of the float 12.

The overflow drain $O_D$ includes a conduit 44 having a valve 45 disposed therein which is closed during the normal operating of the generator but which is open while the chamber C is being filled with water. One end of the conduit 44 extends upwardly to a desired level within the chamber C while the other end extends outwardly and downwardly from the chamber and is submerged to a suitable depth below the liquid surface in a conventional liquid seal. As shown in connection with the generator G′ the liquid seal WS′ comprises a vertically disposed cylindrical chamber 48′ substantially filled with water into which the conduit 44′ extends for a sufficient depth to prevent the escape of acetylene from the chamber C′ while the latter is being refilled with water. An overflow conduit 52′ is disposed in the upper portion of the chamber 48′ to convey the excess water to a suitable drain (not shown). An agitator 50′ or other suitable stirring means may be disposed near the end of the conduit 44′ in the water seal WS′ to prevent sludge, which may be carried over from the generating chamber, from interfering with the proper operation of the water seal.

A gas conduit 20, having disposed therein a service valve 22 and a stop or lock-up valve 32, is secured at one end to the pressure regulator 10 and at the other end to a common supply conduit 33 having little gas storage capacity. An auxiliary conduit 24, having one end secured to a suitable opening in the intermediate housing I and the other end secured to the conduit 20 at a point between the service valve 22 and the stop valve 32, is provided with a stop valve 23, a flow controlling pressure regulating valve 26, and a pressure release valve 30. The common supply line or conduit 33 adapted to receive gas from either or both generators G or G′ extends from the conduits 20 and 20′ to a conventional hydraulic flash arrestor 34. Conduit 36 which extends from the discharge side of the flash arrestor 34 to the service line L is provided preferably with a pressure relief valve 38, a pressure gauge 40 and a service line valve 42.

During normal operation of this type of generator and with particular reference to the generator G, the valves 17, 45, and 23 are closed while the service valve 22, stop valve 32 and service line valve 42 are open. Calcium carbide is supplied from the hopper H to the excess of water in the generating chamber C to form acetylene and calcium hydroxide, the latter forming a sludge which slowly settles to the bottom of the chamber, while the former collects in the upper part of the chamber and in housing I. The acetylene within the generator passes through the pressure regulating valve 10, which is set to maintain a predetermined medium pressure in the service line, and passes into the conduits 20 and 33 to the hydraulic flash arrestor 34. From the hydraulic flash arrestor 34 the acetylene flows through conduit 36, provided with the pressure relief valve 38, pressure gauge 40 and service line valve 42 to the main supply line L. The service line valve 42 is closed when it is desired to isolate both generators from the service line L.

Assuming that the generator G has exhausted its supply of carbide and that the generator G′ is generating acetylene in an amount sufficient to meet the load, acetylene at the desired medium pressure is then passed from the pressure regulating valve 10′, through the conduit 20′, service valve 22′ and stop valve 32′, conduit 33, flash arrestor 34, conduit 36 and service line valve 42 to the service line L. If it is desired to recharge the generator G, the operator closes the service valve 22 and opens the valve 23. It is also preferable to close the carbide supply valve or other carbide feeding means in housing I to prevent escape of excessive amounts of acetylene into the hopper during the recharging operation, although ordinarily, a very small flow of acetylene may be permitted to enter the hopper through a small opening (not shown) to prevent entrance of appreciable amounts of air into the hopper H when it is being charged after the pressure in the generator has been reduced. Opening sludge valve S permits the sludge within the generating chamber C to be rapidly discharged through the trap T to the drain D. While the sludge level falls the residual acetylene in the generating chamber expands and when the gauge pressure decreases to a preselected value of about 4 to 8 inches of water, acetylene at medium pressure flows from conduit 20 through the valve 23, and reducing valve 26 where the pressure is reduced to a preselected value such as a few inches of water above atmospheric pressure. This low pressure acetylene is conveyed through conduit 24 and housing I into the generating chamber C to maintain continuously such pressure in the generator during the sludge discharging and carbide hopper recharging steps. The small superatmospheric pressure within the generator prevents air leakage and avoids the possibility of the formation of dangerous air-acetylene mixtures either in the generator or supply conduits. Sludge trap T provides a seal to prevent low pressure acetylene escaping through the drain D after the chamber has been emptied of sludge.

The sludge valve S is then closed and the hopper H filled with calcium carbide by opening door 21, preferably after first venting the hopper to the atmosphere, to relieve any excess pressure therein, charging a suitable quantity of said carbide into the hopper H, and closing the door 21. Water under pressure is then permitted to enter the chamber C, after the valves 17 and 45 are opened. As the water level rises the acetylene in the chamber C will be compressed, and when the chamber is properly filled with water the pressure of acetylene therein is about equal to the operating pressure of the generator. The float valve 18 automatically shuts off the water supply at the desired level although it is desirable to provide the generating chamber with the overflow drain OD to insure against flooding. Ordinarily if no automatic water valve is employed, valve 17 is not closed until after the operator observes that water is being discharged through the water seal. The valves 17 and 45 are then closed and if desired valve 23 may be closed, valve 22 is opened thus permitting the generator to resume operation in accordance with pressure fluctuations in the supply line to which the pressure regulator 10 responds. Calcium carbide is permitted to react with the water in the generating chamber to form acetylene and calcium hydroxide sludge, the rate of feed of carbide being regulated automatically in accordance with the demand by the feed regulator M.

The stop or lock-up valves 32 and 32′ are closed when it is desired to completely isolate either generator G or G′ respectively from the remainder of the system.

When the carbide supply in generator G′ is depleted and it is desired to recharge this generator, the same procedure as above described with reference to generator G is employed. The generator is isolated from the supply line and the sludge discharged from the generating chamber thereof while supplying thereto, from the other generator or generators, acetylene at a pressure at least slightly above atmosphere pressure to maintain continuously such pressure in said generator during the entire recharging operation. Then after the sludge discharge has been completed the generator is recharged with carbide and water. The presence of valve 45′ is important to isolate the water seal when the generator pressure is increased to the operating pressure. The generator is then put in operation by connecting the generator to the supply system and resuming generation of acetylene at a medium pressure.

The hereinbefore described gas generating apparatus and method of continuously supplying gas therefrom obviates the requirement of venting such gas at each generator recharging and eliminates the necessity of maintaining a gas holder in the service line, although one may be used if desired.

It is also to be understood that the distributing system may comprise one or more of the previously known gas generators, such as the recession type, dry generation type or any combination thereof, provided that the sytsem includes at least one carbide-to-water type of the kind hereinbefore described; and that the structure, form and relative arrangement of the features of the supply system described may be different from that shown without departing from the essence of the invention, of which the present embodiment is but one example of a general structure by which the useful results of the invention are obtained.

What is claimed is:

1. A method of recharging a gas generator in which gas is generated at about one atmosphere gauge pressure by the reaction of a solid and a liquid leaving a residue in the form of a sludge, such method comprising the steps of rapidly discharging said sludge from said generator by employing the pressure of residual gas within said generator to force the sludge therefrom and thereby to expand said gas to a lower superatmospheric pressure; and thereafter supplying, as needed throughout the recharging operation, an additional quantity of said gas at superatmospheric pressure to said generator to maintain continuously therein a preselected superatmospheric pressure throughout said recharging operation.

2. In a method of recharging a gas generator in which gas is generated at about one atmosphere gauge pressure by the reaction of a solid contacting a volume of liquid, said reaction forming a residue in the form of a sludge, the improvement comprising the steps of rapidly discharging said sludge from said generator by expanding, against said sludge, the residual gas within said generator, from said pressure to a lower preselected superatmospheric pressure; and supplying to said generator, as needed throughout the recharging operation, an additional quantity of said gas insufficient to replace the volume of sludge discharged but sufficient to supplement the expanded gas and to maintain continuously said low preselected superatmospheric pressure in said generator throughout said recharging operation.

3. Method of recharging an acetylene generator of the type in which acetylene is generated at a medium pressure of about 10 to 15 pounds per square inch gauge by the reaction between calcium carbide and water, leaving a residue in the form of a sludge, such method comprising the steps of discharging said sludge from said generator by employing the pressure of residual acetylene within said generator to force the sludge therefrom and thereby to expand said acetylene to a lower superatmospheric pressure; supplying additional acetylene as needed to said generator to maintain continuously therein at least said lower superatmospheric pressure throughout such recharging operation; introducing water into said generator at a pressure greater than said medium pressure after said sludge has been discharged therefrom to fill said generator to a predetermined level and to compress the acetylene therein to substantially medium pressure; and resuming operation of said generator at said medium pressure by permitting carbide to contact said water.

4. A method for continuously supplying acetylene at medium pressure to a service line from a system comprising at least two inter-connected generators of the carbide-to-water type in which acetylene and sludge are produced by the reaction of calcium carbide with water, such method comprising the steps of generating acetylene at said pressure in at least one of said generators; recharging another of said generators by discharging said sludge therefrom by the expansion of residual acetylene within said generator, from said pressure to a preselected pressure slightly above atmospheric pressure, against said sludge; thereafter supplying acetylene directly from the first mentioned generator to said other generator at said preselected pressure in an amount insufficient to replace the amount of sludge discharged but in an amount sufficient to maintain continuously said preselected pressure in said other generator throughout such recharging operation; charging said other generator with calcium carbide; supplying water to said other generator to fill the latter to a predetermined level; and resuming generation of acetylene at medium pressure by permitting said carbide to pass into the water within said other generator.

5. Medium pressure acetylene generating apparatus comprising at least two acetylene generators in each of which acetylene is generated by permitting calcium carbide to contact a body of water; a common acetylene supply line for receiving gas generated by each generator and for supplying the same to consuming apparatus, each of said generators having a discharge conduit for directly conveying acetylene produced therein to said supply line; a service value in each of said discharge conduits adapted to be closed when the generator connected thereto is to be recharged; an auxiliary conduit means for each generator connecting such generator with its discharge conduit at a point on the discharge side of the service valve therein, each of said auxiliary conduit means being adapted to conduct acetylene from the discharge side of the service valve of the corresponding one of said generators while the latter is being recharged; and pressure-reducing valve means in each of said auxiliary conduit means adapted to maintain continuously in the generator being recharged a low superatmospheric acetylene pressure.

6. Gas generating and supplying apparatus comprising a medium pressure gas generating system; a service line; conduit means having little gas storage capacity for connecting said system and said service line, said system comprising a plurality of medium pressure generators including one generator of the solid-to-liquid type in which gas is generated by the reaction between a solid and a liquid, leaving a residue in the form of a sludge; pressure means for positively discharging said sludge from said solid-to-liquid type generator; and means for supplying gas from said system to said solid-to-liquid type generator at a relatively low superatmospheric pressure to maintain continuously therein a small superatmospheric pressure while recharging said generator.

7. In a medium pressure acetylene generating system having a plurality of acetylene generators of the type in which acetylene is generated at medium pressure by the reaction between calcium carbide and water, a service line, and conduit means for supplying acetylene from said system to said service line, the improvement comprising the combination of auxiliary conduit means associated with said conduit means and adapted to supply acetylene directly from at least one of said generators to another of said generators while the latter is being recharged, said auxiliary conduit means including a pressure reducing valve arranged to provide a supply of acetylene at a low superatmospheric pressure to such other generator as needed during the recharging operation to maintain continuously in said other generator at least a low superatmospheric pressure.

8. A method of recharging an acetylene generator in which acetylene is generated at medium pressure by the reaction of calcium carbide with water, leaving a residue in the form of a sludge, such method comprising the steps of rapidly discharging said sludge from said generator by employing acetylene under superatmospheric pressure to force out such sludge; and thereafter supplying, as needed throughout the recharging operation, an additional quantity of acetylene at superatmospheric pressure to said generator to maintain continuously therein a superatmospheric pressure throughout said recharging operation.

9. A method for continuously supplying acetylene at medium pressure to a service line from a system including first and second acetylene generators in which acetylene and sludge are produced by reacting calcium carbide with a body of water, which method comprises generating acetylene in said first generator for supply to said service line; while said first generator is supplying said service line, preparing said second generator for operation by discharging sludge therefrom rapidly by employing acetylene under superatmospheric pressure to force out such sludge, introducing a fresh supply of water into said second generator, recharging said second generator with calcium carbide, and throughout the recharging operation maintaining continuously in said second generator at least a low superatmospheric pressure by conveying acetylene from said first generator into said second generator as needed; and thereafter resuming generation of acetylene in said second generator to maintain the supply of acetylene to said service line.

10. A method for continuously supplying acetylene at medium pressure to a service line from a system including first and second acetylene generators in which acetylene and sludge are produced by reacting calcium carbide with a body of water, which method comprises generating acetylene in said first generator and discharging such acetylene to said service line; while said first generator is supplying said service line, preparing said second generator for operation by discharging sludge therefrom rapidly by employing acetylene under superatmospheric pressure to force out such sludge, introducing a fresh supply of water into said second generator, recharging said second generator with calcium carbide, and throughout the recharging operation maintaining continuously in said second generator a low superatmospheric pressure by conveying acetylene at a reduced superatmospheric pressure from said first generator into said second generator as needed; and when said first generator becomes exhausted, automatically resuming generation of acetylene in said second generator and discharging such acetylene to said service line.

11. A method for continuously supplying acetylene at medium pressure to a common supply conduit from a system including a plurality of acetylene generators in which acetylene and sludge are produced by reacting calcium carbide with a body of water, said generators being arranged to discharge acetylene to said common supply conduit, which method comprises generating acetylene in a first generator and discharging such acetylene to said supply conduit; while said first generator is discharging to said supply conduit, preparing a second generator for operation by discharging sludge therefrom rapidly by employing acetylene under superatmospheric pressure to force out such sludge, introducing a fresh supply of water into said second generator, recharging said second generator with calcium carbide, and throughout the recharging operation maintaining continuously in said second generator at least a low superatmospheric pressure by conveying acetylene at a reduced superatmospheric pressure from said common supply conduit into said second generator as needed; and thereafter resuming generation of acetylene in said second generator and discharging such acetylene to said supply conduit.

12. Medium pressure acetylene generating apparatus comprising at least two acetylene generators in each of which acetylene is generated by contact of calcium carbide with a body of water, each generator having an outlet for sludge; a common acetylene supply line; discharge conduits connecting said generators to said common acetylene supply line; service valve means controlling said discharge conduits; and auxiliary conduit means so constructed and arranged as to establish communication between said generators for conducting acetylene from an operating generator to a non-operating generator as required to maintain continuously in the latter at least a low superatmospheric pressure while the latter is being recharged, said auxiliary conduit means having interposed therein flow controlling means for maintaining the supply of acetylene to said non-operating generator at a pressure at least slightly above atmospheric during the recharging.

13. Apparatus according to claim 12, also including stop valve means in said auxiliary conduit means.

14. A gas generating and supplying system comprising a plurality of medium pressure generators including at least one generator of the solid-to-liquid type in which gas is generated by the reaction between a solid and a liquid, leaving a residue in the form af a sludge, said one generator having an outlet for sludge; a common acetylene supply line; conduits directly connecting said generators to said supply line; service valve means controlling the conduit connecting said one generator to said supply line; and means for supplying gas from said system to said one generator as needed while the latter is being recharged, to maintain continuously therein an acetylene pressure at least slightly above atmospheric throughout the recharging operation.

15. Medium pressure acetylene generating apparatus comprising at least two acetylene generators in each of which acetylene is generated by contact of calcium carbide with a body of body, each generator having an outlet for sludge; a common acetylene supply line; discharge conduits connecting said generators to said common acetylene supply line; service valve means controlling said discharge conduits; and auxiliary conduits severally asociated with said generators for conducting acetylene to any non-operating generator as required to maintain continuously in the latter at least a low superatmospheric pressure while the latter is being recharged, each of said auxiliary conduits establishing communication between the generator associated therewith and said common supply line; and flow controlling means so constructed and arranged as to reduce the pressure of the acetylene passing from said common supply line through said auxiliary conduits into said generators.

ROBERT J. KEHL.